United States Patent
Wei et al.

(10) Patent No.: US 8,320,267 B2
(45) Date of Patent: Nov. 27, 2012

(54) REFERENCE SIGNAL SOUNDING FOR UPLINK PILOT TIME SLOT IN WIRELESS COMMUNICATION SYSTEM

(75) Inventors: Na Wei, Chao Yang District (CN); Vijay Nangia, Algonquin, IL (US); Wen Zhou, Chao Yang District (CN); Brian K Classon, Palatine, IL (US)

(73) Assignee: Motorola Mobility LLC, Libertyville, IL (US)

( * ) Notice: Subject to any disclaimer, the term of this patent is extended or adjusted under 35 U.S.C. 154(b) by 499 days.

(21) Appl. No.: 12/489,798

(22) Filed: Jun. 23, 2009

(65) Prior Publication Data

US 2010/0322115 A1  Dec. 23, 2010

(51) Int. Cl.
*H04B 7/216* (2006.01)
(52) U.S. Cl. ........ 370/252; 370/342; 370/345; 455/450; 455/509
(58) Field of Classification Search .......................... None
See application file for complete search history.

(56) References Cited

U.S. PATENT DOCUMENTS

2008/0268857 A1* 10/2008 McCoy et al. ................ 455/447
2009/0181687 A1* 7/2009 Tiirola et al. ................ 455/450
2009/0238241 A1* 9/2009 Hooli et al. .................. 375/133
2010/0027450 A1* 2/2010 Montojo et al. ............. 370/311

OTHER PUBLICATIONS

Sounding Maximum Bandwidth for UpPTS; 3GPP TSG RAN1 #53 BIS; Warsaw, Poland, Jun. 30-Jul. 4, 2008; R1-082329.
Considerations for PRACH and SRS in UpPTS; 3GPP TSG RAN WG1 Meeting #53; Kansas City, MO, USA; May 5-9, 2008; R1-081778.

* cited by examiner

*Primary Examiner* — Chi H. Pham
*Assistant Examiner* — Shick Hom
(74) *Attorney, Agent, or Firm* — Roland K. Bowler, II

(57) ABSTRACT

A wireless terminal operating in TDD mode transmits a plurality of sounding reference signals using an assigned maximum sounding reference signal (SRS) bandwidth (BW) size. At least one of the sounding reference signals is transmitted in a corresponding uplink pilot time slot (UpPTS) region of a special sub-frame of a radio frame wherein, in the frequency dimension, an uplink BW center is misaligned with a BW center of the SRS in the UpPTS region, a maximum SRS BW size in the UpPTS region is an even number of resource blocks with prime factors from a set of $\{2, 3, 5\}$, and the maximum SRS BW having a size in number of resource blocks less than or equal to $(N_{RB}^{UL} - 6 \cdot N_{RA})$ where $N_{RA}$ is a number of Random Access Channel (RACH) opportunities in the UpPTS region.

21 Claims, 4 Drawing Sheets

```
┌─────────────────────────────────────────────┐  ╭410
│ UE RECEIVES A SRS BW ASSIGNMENT ASSIGNING   │
│ THE UE A MAXIMUM SRS BW SIZE SUPPORTED BY   │
│ A PARTICULAR SRS BW SIGNALING INDEX         │
│ CONFIGURATION                               │
└─────────────────────────────────────────────┘
                      │
                      ▼
┌─────────────────────────────────────────────┐  ╭420
│ UE TRANSMITS A PLURALITY OF SOUNDING        │
│ REFERENCE SIGNALS USING THE ASSIGNED        │
│ MAXIMUM SRS BW SIZE                         │
└─────────────────────────────────────────────┘
                      │
                      ▼
┌─────────────────────────────────────────────┐  ╭430
│ UE TRANSMITS AT LEAST ONE SOUNDING          │
│ REFERENCE SIGNAL IN A CORRESPONDING UPLINK  │
│ PILOT TIME SLOT (UpPTS) REGION OF A SPECIAL │
│ SUB-FRAME OF A RADIO FRAME WHEREIN THE      │
│ RADIO FRAME INCLUDES AT LEAST ONE UPLINK    │
│ SUB-FRAME, AT LEAST ONE DOWNLINK SUB-FRAME, │
│ AND THE SPECIAL SUB-FRAME                   │
└─────────────────────────────────────────────┘
```

(A) FOR SYSTEM BANDWIDTH OF 6 - 40RBs

| SIGNALING INDEX# | SRS BW 1 | SRS BW 2 | SRS BW 3 | SRS BW 4 |
|---|---|---|---|---|
| 0 | 36 | 12 | | 4 |
| 1 | 32 | 16 | 8 | 4 |
| 2 | 24 | | | 4 |
| 3 | 20 | | | 4 |
| 4 | 16 | | | 4 |
| 5 | 12 | | | 4 |
| 6 | 8 | | | 4 |
| 7 | 4 | | | |

(B) FOR SYSTEM BANDWIDTH OF 41 - 60RBs

| SIGNALING INDEX# | SRS BW 1 | SRS BW 2 | SRS BW 3 | SRS BW 4 |
|---|---|---|---|---|
| 0 | 48 | 24 | 12 | 4 |
| 1 | 48 | 16 | 8 | 4 |
| 2 | 40 | 20 | | 4 |
| 3 | 36 | 12 | | 4 |
| 4 | 32 | 16 | 8 | 4 |
| 5 | 24 | | | 4 |
| 6 | 20 | | | 4 |
| 7 | 16 | | | 4 |

(C) FOR SYSTEM BANDWIDTH OF 61 - 80RBs

| SIGNALING INDEX# | SRS BW 1 | SRS BW 2 | SRS BW 3 | SRS BW 4 |
|---|---|---|---|---|
| 0 | 72 | 24 | 12 | 4 |
| 1 | 64 | 32 | 16 | 4 |
| 2 | 60 | 20 | | 4 |
| 3 | 48 | 24 | 12 | 4 |
| 4 | 48 | 16 | 8 | 4 |
| 5 | 40 | 20 | | 4 |
| 6 | 36 | 12 | | 4 |
| 7 | 32 | 16 | 8 | 4 |

(D) FOR SYSTEM BANDWIDTH OF 81 - 110RBs

| SIGNALING INDEX# | SRS BW 1 | SRS BW 2 | SRS BW 3 | SRS BW 4 |
|---|---|---|---|---|
| 0 | 96 | 48 | 24 | 4 |
| 1 | 96 | 32 | 16 | 4 |
| 2 | 80 | 40 | 20 | 4 |
| 3 | 72 | 24 | 12 | 4 |
| 4 | 64 | 32 | 16 | 4 |
| 5 | 60 | 20 | | 4 |
| 6 | 48 | 24 | 12 | 4 |
| 7 | 48 | 16 | 8 | 4 |

FIG. 5 (PRIOR ART)

REFERENCE SIGNAL SOUNDING FOR UPLINK PILOT TIME SLOT IN WIRELESS COMMUNICATION SYSTEM

FIELD OF THE DISCLOSURE

The present disclosure relates generally to wireless communication networks and, more particularly, to reference signal sounding in uplink time slots in time division duplex (TDD) mode wireless communication systems.

BACKGROUND

Wireless uplink sounding is considered to be useful for uplink (UL) and downlink (DL) scheduling, especially with channel reciprocity in time division duplex (TDD) mode systems. In the $3^{rd}$ Generation Partnership Project (3GPP) standardization work groups, it has been proposed that the minimum sounding reference signal (SRS) bandwidth (BW) value be 4 resource blocks (RBs) and that all SRS bandwidths be multiples of 4 RBs. It has also been proposed that SRS bandwidths be tree-based. These assumptions help limit signaling requirements but may lead to missing out some edge resource blocks due to restricted flexibility. For example, for system BW of 81-110 RBs, the possible SRS BW is 4, 8, 12, 16, 20, 24, 32, 40, 48, 60, 64, 72, 80 and 96 resource blocks. The maximum number of unsounded resource blocks is 15, which corresponds to a maximum unsounded system BW of 2.7 MHz. This may be problematic in frequency selective channels. For example, a typical urban channel has a coherent channel bandwidth of roughly 200 KHz, which is narrower than the maximum unsounded system BW. The downlink scheduler also cannot simply assign the edge RBs for a distributed virtual resource block (DVRB), since mirroring is not used for DVRB operation.

In 3GPP, the durations and usage of an uplink pilot time slot (UpPTS) was proposed for TDD mode. If the UpPTS has a single (1) SC-FDMA symbol duration, it is used for sounding reference signals only. If the UpPTS has a two (2) OFDM symbol duration, it is used for short random access and/or SRS. The short random access, if present, may occupy from 1 to up to 6 groups of 6 RBs each, from the top or bottom of the band in alternating UpPTSs. Since there is no physical uplink control channel (PUCCH) or data in the UpPTS, problems that may occur when the SRS is transmitted in ordinary uplink sub-frames are not present when the SRS is transmitted in UpPTS. It is therefore considered to be beneficial for TDD to allocate SRSs in UpPTS rather than in ordinary uplink sub-frames. However, the unsounded RBs as explained above remain an issue. Moreover, with the special property of UpPTS, any unsounded RBs in UpPTS cannot be used easily for another purpose.

While there may be some benefits for full bandwidth sounding for UpPTS, the impact of deviating from current operation must be carefully considered. One consideration is that the sounding sequences should still be based on the existing UL demodulation reference signal (DM RS) sequences so that new sequences do not need to be generated and specified. Besides, the commonality of frequency division duplex (FDD) and TDD modes should be maximized for the benefits of module reuse.

The various aspects, features and advantages of the disclosure will become more fully apparent to those having ordinary skill in the art upon careful consideration of the following Detailed Description thereof with the accompanying drawings described below. The drawings may have been simplified for clarity and are not necessarily drawn to scale.

BRIEF DESCRIPTION OF THE DRAWINGS

FIG. 5 illustrates tables of prior art SRS BW for different systems.

DETAILED DESCRIPTION

Figure 1:
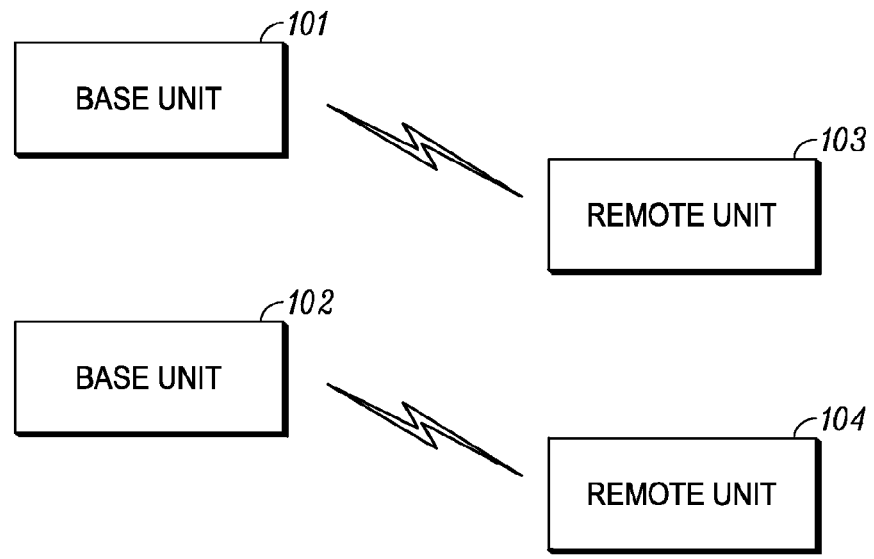
FIG. 1 is a wireless communication network.

In FIG. 1, a wireless communication system 100 comprises one or more fixed base infrastructure units 101, 102 forming a network distributed over a geographical region for serving remote units in the time and/or frequency and/or spatial domain. A base unit may also be referred to as an access point, access terminal, base, base station, Node-B, eNode-B, Home Node-B, Home eNode-B, relay node or by other terminology used in the art. The one or more base units each comprise one or more transmitters for downlink transmissions and one or more receivers for receiving uplink transmissions. The base units are generally part of a radio access network that includes one or more controllers communicably coupled to one or more corresponding base units. The access network is generally communicably coupled to one or more core networks, which may be coupled to other networks, like the Internet and public switched telephone networks, among other networks. These and other elements of access and core networks are not illustrated but they are well known generally by those having ordinary skill in the art.

In FIG. 1, the one or more base units serve a number of remote units 103, 104 within a corresponding serving area, for example, a cell or a cell sector via a wireless communication link. In one implementation, the remote units support aggregated carrier access. The remote units may be fixed units or mobile terminals. The remote units may also be referred to as subscriber units, mobiles, mobile stations, users, terminals, subscriber stations, user equipment (UE), user terminals, wireless communication devices or by other terminology used in the art. The remote units also comprise one or more transmitters and one or more receivers. In FIG. 1, the base unit 101 serves remote unit 103 and base unit 102 serves remote unit 104 in the time and/or frequency domain and/or spatial domain. Sometimes the base unit is referred to as a "serving" or connected or anchor cell for the remote unit. The remote units may have half duplex (HD) or full duplex (FD) transceivers. Half-duplex transceivers do not transmit and receive simultaneously whereas full duplex terminals do. The remote units may also communicate with the base unit via a relay node.

In one implementation, the wireless communication system is compliant with the Third Generation Partnership Project (3GPP) Universal Mobile Telecommunications System (UMTS) Long Term Evolution (LTE) protocol, also referred to as EUTRA or LTE Release-8 (Rel-8), wherein the base unit transmits using an orthogonal frequency division multiplexing (OFDM) modulation scheme on the downlink and the user terminals transmit on an uplink using a single carrier frequency division multiple access (SC-FDMA) scheme. In another implementation, the wireless communication system is compliant with the 3GPP UMTS LTE-Advanced protocol, also referred to as LTE-A or some later generation or release of LTE wherein the base unit can transmit using an orthogonal frequency division multiplexing (OFDM) modulation scheme on a single or a plurality of downlink component carriers and the user terminals can transmit on the uplink using a single or plurality of uplink component carriers. More generally, however, the wireless communication system may implement some other open or proprietary communication protocol, for example, WiMAX, among other protocols. The disclosure is not intended to be limited to the implementation of any particular wireless communication system architecture or protocol. The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading, or the architecture may be based on simpler time and/or frequency division multiplexing/multiple access techniques, or a combination of these various techniques. In alternate embodiments, the communication system may utilize other cellular communication system protocols including, but not limited to, TDMA or direct sequence CDMA. The communication system may be a TDD (Time Division Duplex) or FDD (Frequency Division Duplex) system.

Figure 2:
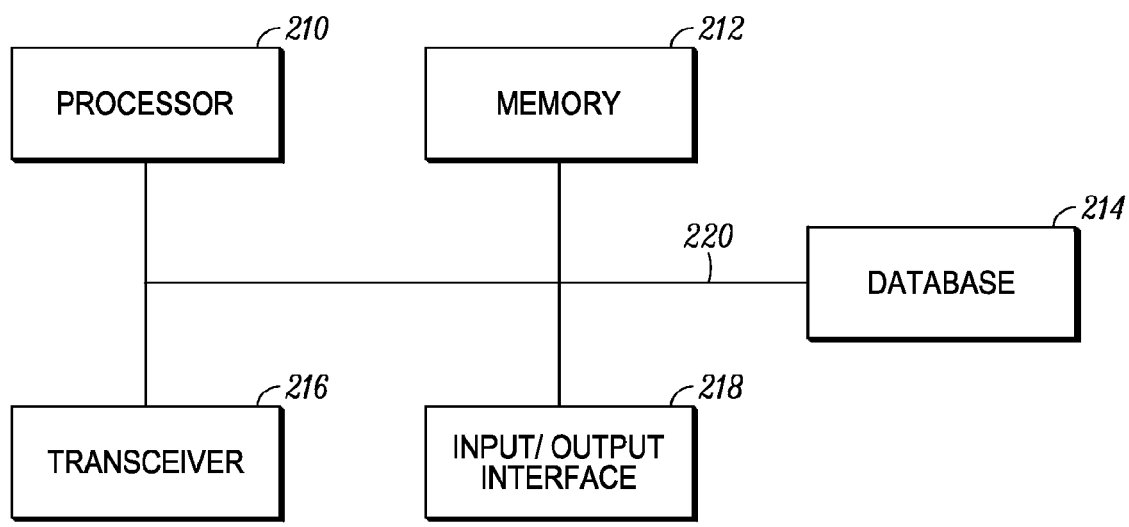
FIG. 2 is a wireless communication terminal.

In FIG. 2, a user terminal (UE) 200 comprises a controller/processor 210 communicably coupled to memory 212, a database 214, a transceiver 216, input/output (I/O) device interface 218 connected through a system bus 220. The UE is compliant with the protocol of the wireless communication system within which it operates, for example, LTE Rel-8 or a later generation protocol discussed above. In FIG. 2, the controller/processor 210 may be implemented as any programmed processor. However, the functionality described herein may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In FIG. 2, the memory 212 may include volatile and nonvolatile data storage, including one or more electrical, magnetic or optical memories such as a random access memory (RAM), cache, hard drive, read-only memory (ROM), firmware, or other memory device. The memory may have a cache to speed access to specific data. Data may be stored in the memory or in a separate database. The database interface 214 may be used by the controller/processor to access the database. The transceiver 216 is capable of communicating with user terminals and base stations pursuant to the wireless communication protocol implemented. The I/O device interface 218 connects to one or more input devices that may include a keyboard, mouse, pen-operated touch screen or monitor, voice-recognition device, or any other device that accepts input. The I/O device interface may also connect to one or more output devices, such as a monitor, printer, disk drive, speakers, or any other device provided to output data.

Figure 3:
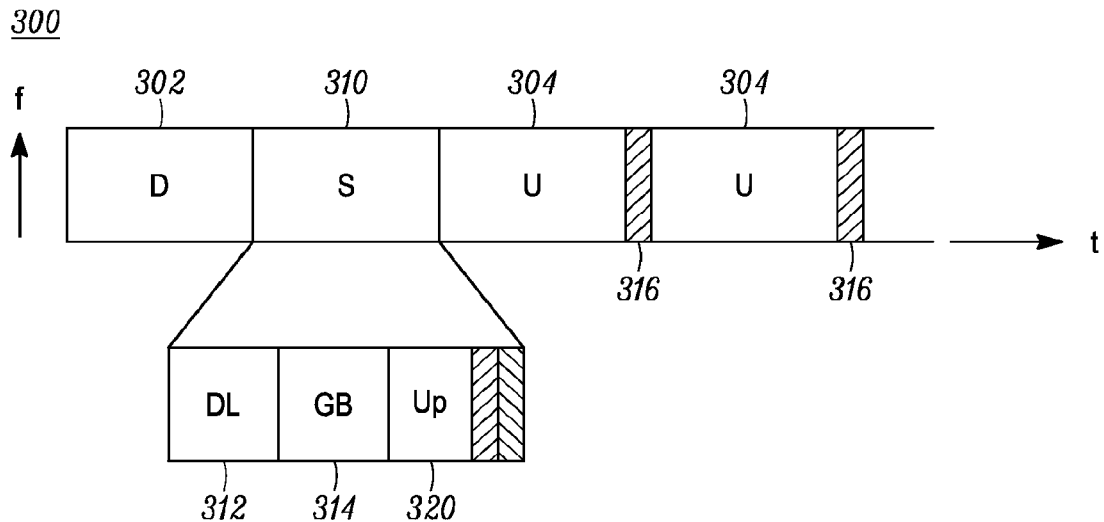
FIG. 3 illustrates a radio frame comprising sub-frames having resource blocks in the time and frequency domain.

In 3GPP, the durations and usage of an uplink pilot time slot (UpPTS) was proposed for TDD mode. FIG. 3 illustrates a radio frame 300 comprising sub-frames having resource blocks in the time and frequency domain. The radio frame includes at least one downlink sub-frame 302, at least one uplink sub-frame 304 and at least one special sub-frame 310. The special sub-frame includes a downlink pilot time slot (DwPTS) region 312, a guard period (GP) or guard band (GB) 314 and an UpPTS region 320.

Figure 4:
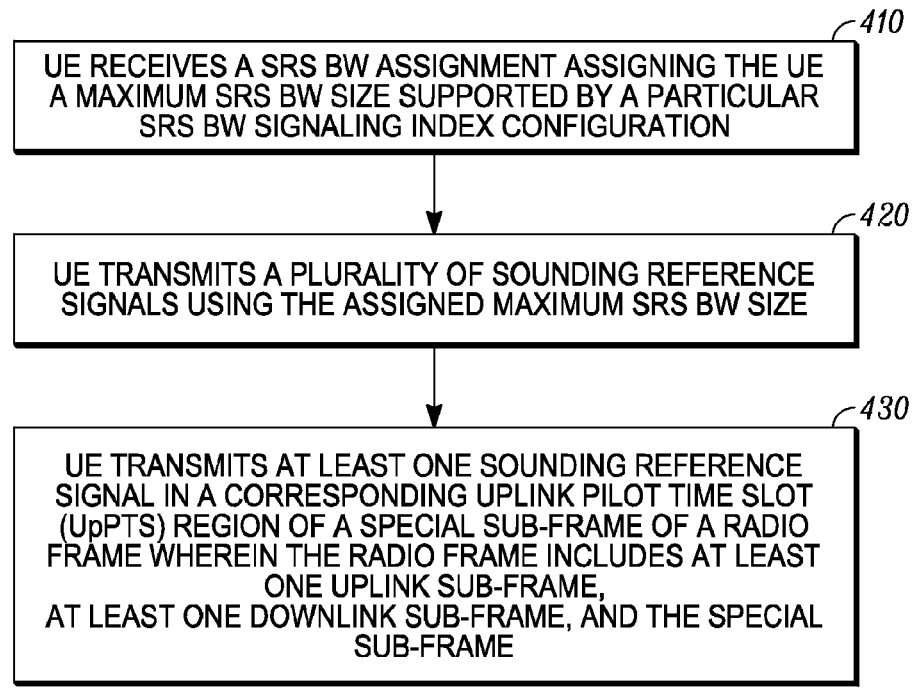
FIG. 4 illustrates a process flow diagram.

In the process diagram of FIG. 4, at 410, the UE receives a sounding reference signal (SRS) bandwidth (BW) assignment assigning the UE a maximum SRS BW size supported by a particular SRS BW signaling index configuration. In one embodiment, the SRS BW assignment is communicated in a dedicated message. FIG. 5 illustrates exemplary Tables (a-d) of prior art SRS BW for different system bandwidths. In FIG. 5, for a particular system bandwidth, the "Signaling Index" is cell specific. Thus when a UE is served by a particular base station, the signaling index dictates the possible SRS bandwidths that may be assigned to a UE. The instant disclosure relates to cases where the SRS BW assigned to the UE is the maximum BW. In FIG. 5, the maximum SRS BW for each cell specific signaling index is SRS BW1. Thus for "Signaling Index 0", the SRS BW1=36. In one embodiment, the UE receives a system information broadcast message indicating a particular SRS BW signaling index configuration to be used by the UE, wherein the SRS BW signaling index configuration supports multiple SRS bandwidths including the SRS BW assigned to the UE.

In FIG. 4, at 420, the UE transmits a plurality of sounding reference signals using the assigned maximum SRS BW size. In one embodiment, at 430, at least one of the sounding reference signals is transmitted in a corresponding uplink pilot time slot (UpPTS) region of a special sub-frame of a radio frame wherein the radio frame includes at least one uplink sub-frame, at least one downlink sub-frame, and the special sub-frame. An uplink bandwidth of the radio frame comprises resource blocks ($N_{RB}^{UL}$) wherein each resource block comprises a plurality of sub-carriers in the frequency dimension. The uplink BW is the BW for the uplink sub-frames and the UpPTS region of the special sub-frame.

Figure 6:
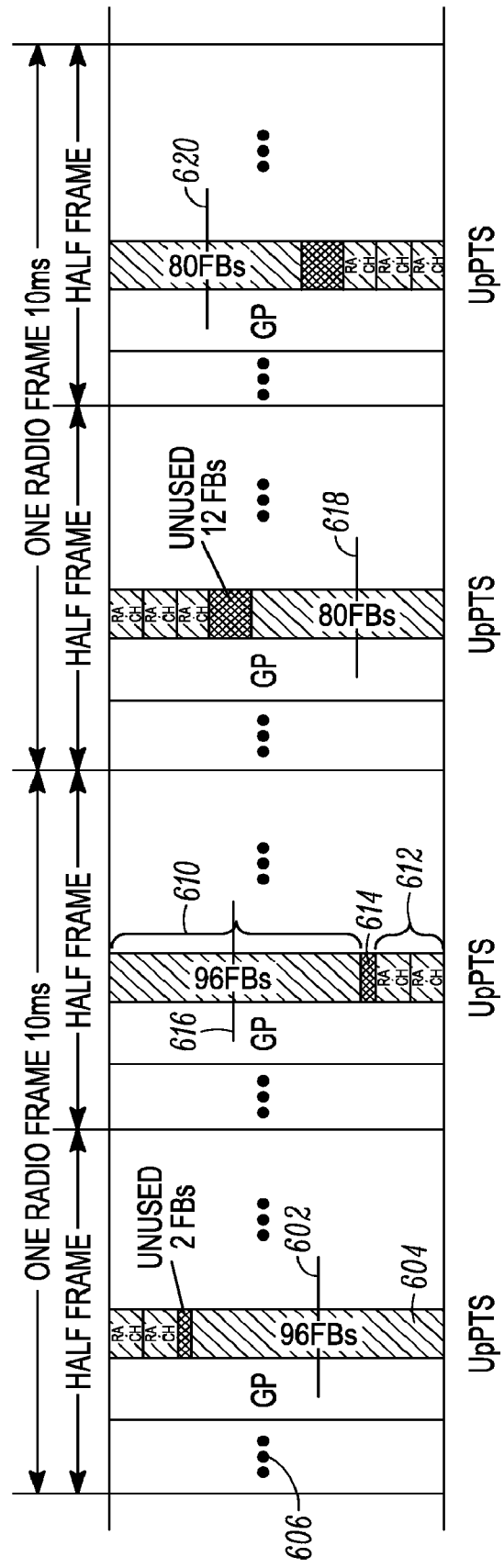
FIG. 6 illustrates portions of a radio frame wherein the SRS BW center is misaligned relative to an UL BW center.

According to one aspect of the disclosure, an uplink BW center is misaligned with a BW center of the SRS in the frequency dimension in the UpPTS region wherein a maximum SRS BW size in the UpPTS region is an even number of resource blocks with prime factors from a set of {2, 3, 5}, and the maximum SRS BW having a size in number of resource blocks less than or equal to ($N_{RB}^{UL}$31 6·$N_{RA}$) where $N_{RA}$ is a number of Random Access Channel (RACH) opportunities in the UpPTS region. $N_{RA}$ may be different in different UpPTS regions of different special sub-frames, and thus the maximum SRS BW size in the UpPTS region may be different in different special subframes. FIG. 6 illustrates the SRS BW center 602 in the UpPTS region 604 misaligned with the UL BW center 606. In one embodiment, the center of the uplink BW is expressed in terms of an integer number of resource blocks.

In one implementation, the maximum SRS BW size in the UpPTS region, in number of resource blocks, is $2^{(1+\alpha_2)} \cdot 3^{\alpha_3} \cdot 5^{\alpha_5} \leq (N_{RB}^{UL} - 6 \cdot N_{RA})$ and $\alpha_2, \alpha_3, \alpha_5$ is a set of non-negative integers, $\alpha_2, \alpha_3, \alpha_5 \geq 0$.

In one embodiment, the SRS BW occupies only a subset of the resource blocks in the uplink BW in the frequency dimension of the UpPTS region. In one implementation, the UE transmits the SRS in the UpPTS region of the special sub-frame using the maximum SRS BW size on every Nth sub-carrier of the occupied subset of resource blocks, where N=2. In another embodiment, the SRS in the UpPTS region occupies a subset of resource blocks in the uplink bandwidth in the frequency dimension, wherein the subset of the resource blocks excludes resource blocks assigned for RACH opportunities in the UpPTS region and excludes at least one additional resource block located between the subset of resource blocks of the maximum SRS BW size sounding reference signal and the RACH assigned resource blocks. FIG. 6 illustrates resource blocks 610 occupying a subset of resource blocks in the uplink bandwidth in the frequency dimension of the UpPTS, resources blocks 612 allocated for RACH opportunities, and one or more resource blocks 614 located between the subset of resource blocks and the SRS and the RACH resource blocks. In some embodiments, the resource blocks 614 are not used.

More generally, each of a plurality of SRSs are transmitted in a corresponding UpPTS region of a corresponding special sub-frame of one or more radio frames. In one embodiment, the BW centers of the SRSs in consecutive special sub-frames are different. FIG. 6 illustrates the BW centers of SRS 602, 616, 618 and 620 being different in the frequency domain. In one embodiment, the BW centers of SRSs in alternating special sub-frames are the same.

In another embodiment, at least one of the sounding reference signals is transmitted in a corresponding uplink sub-frame of the radio frame, wherein a maximum SRS BW of the SRS transmitted in the uplink sub-frame is different than a maximum SRS BW of the SRS transmitted in the special sub-frame. In FIG. 3 for example, the SRS is transmitted in the region 316 of the UL sub-frame 304. In another embodiment, at least one of the sounding reference signals is transmitted in an uplink sub-frame using the maximum SRS BW size assigned. In another embodiment, the maximum SRS BW size for the special sub-frame is greater than the maximum SRS BW for the uplink sub-frame.

In some implementations, the UE receives a broadcast message in a system information block (SIB) message indicating that the maximum SRS BW for the special sub-frame is different than the maximum SRS BW size assigned. The broadcast message is a cell-specific message. In one embodiment, the maximum SRS BW size for the special sub-frame is greater than the maximum SRS BW size assigned. The UE may receive a broadcast message in a system information block message indicating that the maximum SRS BW for the special sub-frame is different than a supported maximum SRS BW on the uplink sub-frame. The system information broadcast message may also indicate the particular SRS BW signaling index configuration to be used by the UE. The UE may also receive a dedicated message indicating the SRS BW assigned. The UE is thus configured to transmit the sounding reference signal accordingly.

In one embodiment, the SRS signal is based on a Generalized Chirp Like (GCL) or a Zadoff-Chu sequence. In an alternative embodiment, the SRS signal is based on a pseudo-random sequence or some other sequence known in the art.

In one embodiment, the SRS transmissions are on a single component carrier where $N_{RB}^{UL}$ is the number of resource blocks in the uplink bandwidth for the component carrier and $N_{RA}$ is the number of Random Access Channel (RACH) opportunities in the UpPTS region of the component carrier.

In another embodiment, the SRS transmissions are on more than one component carrier with the maximum SRS BW size in the UpPTS region being different for different component carriers, depending on the uplink bandwidth ($N_{RB}^{UL}$) and RACH opportunities ($N_{RA}$) in each component carrier.

In one embodiment, the UE comprises a plurality of transmitters, and transmits sounding reference signals simultaneously from all or a subset of the transmitters. The sounding reference signals from the different transmitters may have different SRS BWs and may occupy different subsets of resource blocks or different subsets of sub-carriers. In one embodiment, the sounding reference signals from the different transmitters have the same SRS bandwidth but occupy different every Nth sub-carrier of the occupied subset of resource blocks. In one embodiment N=2. In another embodiment, the sounding reference signals from the different transmitters have the same SRS bandwidth and occupy the same sub-carriers and same occupied subset of resource blocks. In this embodiment, the sounding reference signals from the different transmitters are orthogonal by using different cyclic time shifts of a waveform. The waveform may be based on a Generalized Chirp Like (GCL) or a Zadoff-Chu sequence or other sequences known in the art. In another embodiment, the sounding reference signals from the different transmitters have the same SRS bandwidth and occupy the same set of sub-carriers and the cyclic time shifts are orthogonal by using different time-domain spreading codes such as Walsh, Hadamard or DFT-codes. For example, with two transmitters, the first transmitter transmits the SRS signal on two uplink symbols using Walsh code [+1 +1] and the second transmitter transmits the SRS signal on the same two uplink symbols using Walsh code [+1 −1]. The two uplink symbols may be adjacent such as in the case when the UpPTS duration is 2 symbols. Alternatively, the two uplink symbols may occupy different sub-frame combinations, such as (UpPTS+UL sub-frame), (UpPTS+UpPTS), (UL sub-frame+UL sub-frame). The UE is notified, by a message, of one or more of the assigned SRS bandwidth, occupied subset of sub-carriers or resource blocks, cyclic time shift, transmission sub-frames for the SRS from the first transmitter. The message could be a system configuration message like a system information block (SIB) or a higher layer configuration message such as an RRC configuration message. Generally the configuration message may be a broadcast message or a dedicated message. In one embodiment, the UE implicitly determines the SRS parameters for the second transmitter. In another embodiment, the UE is explicitly signaled the parameters for the second transmitter. At least one of the parameters of the second transmitter may be differentially encoded. For the case when the second transmitter parameters are implicitly determined, the cyclic time shift of the second transmitter may be a predetermined fixed offset from the cyclic time shift of the first transmitter modulo the total number of cyclic shifts supported. Alternatively, the second transmitter may use the same cyclic time shift and achieve orthogonality between the SRS transmissions between the first and second transmitter by using different predetermined time-domain spreading codes as mentioned above. For example, the first transmitter may use predetermined spreading code [+1 +1] and the second transmitter may use predetermined spreading code [+1 −1].

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A wireless terminal (UE) operating in a time division duplex (TDD) mode, comprising:
   a transceiver;
   a processor coupled to the transceiver,
   the UE configured to receive a sounding reference signal (SRS) bandwidth (BW) assignment assigning the UE a maximum SRS BW size supported by a particular SRS BW signaling index configuration;
   the UE configured to transmit a plurality of sounding reference signals, at least one of the sounding reference signals is transmitted in a corresponding uplink pilot time slot (UpPTS) region of a special sub-frame of a radio frame, the radio frame including at least one uplink sub-frame, at least one downlink sub-frame, and the at least one special sub-frame, an uplink bandwidth comprising resource blocks ($N_{RB}^{UL}$) wherein each resource block comprises a plurality of sub-carriers in the frequency dimension, wherein, in the frequency dimension, an uplink BW center is misaligned with a BW center of the SRS in the UpPTS region, and the sounding reference signal transmitted in the UpPTS region using a maximum SRS BW size in number of resource blocks having a largest value that is an even number of resource blocks with prime factors from a set of $\{2, 3, 5\}$, and is less than or equal to ($N_{RB}^{UL} - 6 \cdot N_{RA}$) where $N_{RA}$ is a number of Random Access Channel (RACH) opportunities in the UpPTS region.

2. The terminal of claim 1,
wherein the maximum SRS BW size in the UpPTS region in number of resource blocks is $2^{(1+\alpha_2)} \cdot 3^{\alpha_3} \cdot 5^{\alpha_5} \leq (N_{RB}^{UL} - 6 \cdot N_{RA})$ and $\alpha_2, \alpha_3, \alpha_5$ and $\alpha_2, \alpha_3, \alpha_5$ is a set of non-negative integers, $\alpha_2, \alpha_3, \alpha_5 \geq 0$,
wherein the sounding reference signal in the UpPTS region of the special sub-frame is transmitted using the maximum SRS BW size.

3. The terminal of claim 1,
wherein the SRS in the UpPTS region occupying a subset of the resource blocks in the uplink bandwidth in the frequency dimension,
wherein the subset of the resource blocks excludes resource blocks assigned for RACH opportunities and excludes at least one additional resource block, wherein the at least one additional resource block is between the SRS resource blocks and the RACH resource blocks,
wherein the sounding reference signal in the UpPTS region of the special sub-frame is transmitted using the maximum SRS BW size on the occupied subset of resource blocks.

4. The terminal of claim 1,
wherein the SRS in the UpPTS region occupying a subset of the resource blocks in the uplink bandwidth in the frequency dimension,
wherein the SRS in the UpPTS region is transmitted using the maximum SRS BW size on every Nth sub-carrier of the occupied subset of resource blocks, where N=2.

5. The terminal of claim 1, wherein the center of the uplink bandwidth is expressed in terms of an integer number of resource blocks.

6. The terminal of claim 1, wherein each of at least some of the SRS are transmitted in a corresponding UpPTS region of a corresponding special sub-frame of one or more radio frames, wherein the BW center of the SRS in consecutive special sub-frames are different.

7. The terminal of claim 6, wherein the BW centers of sounding reference signals in alternating special sub-frames are the same.

8. The terminal of claim 1,
wherein at least one of the sounding reference signals is transmitted in a corresponding uplink sub-frame of the radio frame,
wherein a maximum SRS BW of the SRS transmitted in the uplink sub-frame is different than a maximum SRS BW of the SRS transmitted in the special sub-frame.

9. The terminal of claim 1 is configured to receive a broadcast message in a system information block message indicating that the maximum SRS BW in the UpPTS region of the special sub-frame is different than the maximum SRS BW size assigned.

10. The terminal of claim 1 is configured to receive a broadcast message in a system information block message indicating that the maximum SRS BW in the UpPTS region of the special sub-frame is different than a supported maximum SRS BW on the uplink sub-frame.

11. The terminal of claim 1,
the UE configured to receive the SRS BW assignment in a dedicated message,
the UE configured to receive a system information broadcast message indicating a particular SRS BW signaling index configuration to be used by the UE, wherein the SRS BW signaling index configuration supports multiple SRS bandwidths including the SRS BW assigned to the UE.

12. A wireless terminal (UE) operating in a time division duplex (TDD) mode, comprising:
a transceiver;
a processor coupled to the transceiver,
the UE configured to transmit a plurality of sounding reference signals,
at least one of the sounding reference signals transmitted in a corresponding uplink pilot time slot (UpPTS) region of a special sub-frame of a radio frame, the radio frame having at least one uplink sub-frame, at least one downlink sub-frame, and at least one special sub-frame;
the UE configured to receive a sounding reference signal (SRS) bandwidth (BW) assignment assigning the UE a maximum SRS BW size supported by a particular SRS BW signaling index configuration, the particular SRS BW signaling index configuration supports multiple SRS bandwidths, at least two of the SRS bandwidths of the signaling index configuration having different sizes;
the UE configured to receive a message indicating that the maximum SRS BW size in the UpPTS region of the special sub-frame is different than the maximum SRS BW size assigned,
the sounding reference signal transmitted in the uplink pilot time slot (UpPTS) region of the special sub-frame using the maximum SRS BW size in the UpPTS region of the special sub-frame.

13. The terminal of claim 12,
wherein the maximum SRS BW size in the UpPTS region of the special sub-frame is greater than the maximum SRS BW size assigned,
wherein the sounding reference signal in the UpPTS region of the special sub-frame is transmitted using the maximum SRS BW size that is greater than the maximum SRS BW size assigned.

14. The terminal of claim 12 wherein at least one of the sounding reference signals in an uplink sub-frame is transmitted using the maximum SRS BW size assigned.

15. The terminal of claim 14,
wherein the maximum SRS BW size in the UpPTS region of the special sub-frame is greater than the maximum SRS BW for the uplink sub-frame,
wherein the sounding reference signal in the UpPTS region is transmitted using the maximum SRS BW size that is greater than the maximum SRS BW size for the uplink sub-frame.

16. The terminal of claim 12,
wherein the SRS BW assignment is received in a dedicated message,
wherein the message indicating that the maximum SRS BW size in the UpPTS region of the special sub-frame is different than the maximum SRS BW size assigned is received in a system information broadcast message, wherein the system information broadcast message also indicates the particular SRS BW signaling index configuration.

17. The terminal of claim 12, the uplink bandwidth comprising a plurality of resource blocks ($N_{RB}^{UL}$) each resource block comprising a plurality of sub-carriers in the frequency dimension, wherein the maximum SRS BW size in the UpPTS region of the special subframe is an integer number of resource blocks and the sounding reference signal in the UpPTS region of the special sub-frame occupying a subset of the resource blocks in the uplink bandwidth in the frequency dimension, wherein the sounding reference signal in the UpPTS region of the special sub-frame is transmitted using the maximum SRS BW size on the occupied subset of resource blocks.

18. The terminal of claim 17, wherein the maximum SRS BW size in the UpPTS region of the special sub-frame in number of resource blocks having a largest value that is an even number of resource blocks with prime factors from the set of {2, 3, 5}, and less than or equal to ($N_{RB}^{UL}-6 \cdot N_{RA}$) where $N_{RA}$ is a number of Random Access Channel (RACH) opportunities in the UpPTS region, wherein the sounding reference signal in the UpPTS region is transmitted using the maximum SRS BW size in the UpPTS region of the special sub-frame.

19. The terminal of claim 18, wherein the maximum SRS BW size in the UpPTS region of the special sub-frame in number of resource blocks is $2^{(1+\alpha_2)} \cdot 3^{\alpha_3} \cdot 5^{\alpha_5} \leq (N_{RB}^{UL}-6 \cdot N_{RA})$ and $\alpha_2, \alpha_3, \alpha_5$ is a set of non-negative integers, $\alpha_2, \alpha_3, \alpha_5 \geq 0$, wherein the sounding reference signal in the UpPTS region is transmitted using the maximum SRS BW size in the UpPTS region of the special sub-frame.

20. The terminal of claim 17, the sounding reference signal in the UpPTS region occupying a subset of the resource blocks excluding resource blocks assigned for RACH opportunities in the UpPTS region and excluding at least one additional resource block, wherein the at least one additional resource block is between the subset of resource blocks of the maximum SRS BW size sounding reference signal and the RACH assigned resource blocks, wherein the sounding reference signal in the UpPTS region is transmitted using the maximum SRS BW size on the occupied subset of resource blocks.

21. The terminal of claim 17, wherein the sounding reference signal in the UpPTS region is transmitted using the maximum SRS BW size on every Nth sub-carrier of the occupied subset of resource blocks, where N=2.

* * * * *